United States Patent
Matsubara (10) Patent No.: US 7,923,880 B2
(45) Date of Patent: Apr. 12, 2011

(54) STEPPING MOTOR

(75) Inventor: Masaaki Matsubara, Yonago (JP)

(73) Assignee: Minebea Motor Manufacturing Corporation, Tokyo-To (JP)

( * ) Notice: Subject to any disclaimer, the term of this patent is extended or adjusted under 35 U.S.C. 154(b) by 206 days.

(21) Appl. No.: 12/318,233

(22) Filed: Dec. 23, 2008

(65) Prior Publication Data
US 2009/0218903 A1 Sep. 3, 2009

(30) Foreign Application Priority Data
Feb. 28, 2008 (JP) .................. 2008-047837

(51) Int. Cl.
*H02K 21/22* (2006.01)
(52) U.S. Cl. .......... 310/156.66; 310/216.112; 310/49.11
(58) Field of Classification Search ............... 310/49 R, 310/49.11, 49.48, 49.51, 156.55, 156.66, 310/216.073, 216.074, 216.088, 216.091, 310/216.092, 216.093, 216.094, 216.096, 310/216.097, 216.098, 216.112, 216.114
See application file for complete search history.

(56) References Cited

U.S. PATENT DOCUMENTS

| | | | | |
|---|---|---|---|---|
| 3,508,091 A | * | 4/1970 | Kavanaugh | 310/49.11 |
| 4,501,981 A | * | 2/1985 | Hansen | 310/49.18 |
| 4,672,253 A | * | 6/1987 | Tajima et al. | 310/269 |
| 4,899,073 A | * | 2/1990 | Takeuchi et al. | 310/116 |
| 5,808,390 A | * | 9/1998 | Miyazawa et al. | 310/194 |
| 2004/0056553 A1 | * | 3/2004 | Fujinaka | 310/216 |
| 2004/0061405 A1 | * | 4/2004 | Horng et al. | 310/216 |

FOREIGN PATENT DOCUMENTS

| | | | |
|---|---|---|---|
| JP | 54114710 A | * | 9/1979 |
| JP | 58083576 A | * | 5/1983 |
| JP | 60-43059 | | 3/1985 |
| JP | 63056163 A | * | 3/1988 |
| JP | 6-78513 | | 3/1994 |
| JP | 9-308214 | | 11/1997 |

* cited by examiner

*Primary Examiner* — Quyen Leung
*Assistant Examiner* — Naishadh N Desai
(74) *Attorney, Agent, or Firm* — Wenderoth, Lind & Ponack, L.L.P.

(57) ABSTRACT

A single phase stepping motor has a stator, and a rotor disposed to surround the stator. The stator includes first and second annular stator yokes, which are disposed opposite to each other and have a plurality of pole teeth formed along a circumference thereof, and an annular stator coil disposed between the first and second stator yokes. The rotor includes a ring magnet, which is disposed to surround the first and second stator yokes, and has a plurality of magnetic poles formed along a circumference of the rotor, and a shaft disposed at a center position of the magnet. At least a partial region of a gap formed between each of the pole teeth and the opposing magnetic pole of the magnet is non-uniform in a predetermined direction.

5 Claims, 6 Drawing Sheets

STEPPING MOTOR

BACKGROUND OF THE INVENTION

1. Field of the Invention

The present invention relates to a single phase stepping motor having a rotor that is disposed so as to surround a stator.

2. Related Art

Stepping motors are used in various fields because they are simple in structure and easy to control. A permanent magnet (PM) stepping motor, in particular, is widely used in various fields because it can be manufactured economically.

With this type of stepping motor, reliability is important, and it is required that the motor starts up surely normally under conditions of all kinds. To ensure normal startup, it is necessary to control the stepping motor so that it stops at predetermined precise positions. In order to control the stop position at high precision, a detent torque is generally adjusted as small as possible. This is because the detent torque functions as a load when the rotor rotates. Here, the "detent torque" means a torque held when a power is not supplied. On the other hand, a torque held when the power is supplied is called as a holding torque.

However, where the load is large, for example like a stepping motor used for generating vibration, when the load is an eccentric weight, it is difficult to control the rotor to surely stop at desired stop positions when the power is not supplied. Accordingly, there is proposed a technique in which the detent torque is increased to surely stop the load when the power is not supplied (JP-A (Kokai) No. 60-43059, JP-A (Kokai) No. 6-78513 and JP-A (Kokai) No. 9-308214).

As one type of PM stepping motor, there is an outer rotor type single phase stepping motor, in which the rotor is disposed so as to surround an annular stator. The stator has stator yokes in which a plurality of pole teeth are formed, and the rotor has a magnet disposed around a circumference thereof. The magnet has a plurality of magnetic poles of which neighboring magnetic poles have different polarities.

In the outer rotor type of single phase stepping motor, the stable positions (stop positions) of the holding torque are positions where the centers of the magnetic poles of the magnet approximately coincide with the centers in width dimensions of the pole teeth of the stator yoke. As many positions exist as the total number of the magnetic poles of the magnet with respect to each direction of the current flowing through the stator coil. Thus, if the total number of the magnetic poles of the magnet is eight, there will be four stable positions (stop positions) for each of the current directions. For example, assuming that each of the magnetic poles has equal width, stable positions of the holding torque is provided at 90-degree intervals in each current direction flowing through the stator coil. On the other hand, the stable positions (stop positions) of the detent torque are also the positions where the centers of the magnetic poles of the magnet approximately coincide with the centers in width dimensions of the pole teeth of the stator yoke. As many positions exist as the total number of the magnetic poles of the magnet.

In this way, when the stable positions of the holding torque coincide with the stable positions of the detent torque, there is a concern that the startup after a stop may not be normally performed. A solution for this concern is to provide commutating poles that increase/decrease the width of some of a plurality of pole teeth of the stator yoke. The reason for providing such commutating poles is that if the commutating poles are not provided and the single phase stepping motor is tried to start up at the stable position, the motor might fail to start up normally, or might operate only a half of one step. If the commutating poles are provided, it is possible to shift the stable positions of the holding torque from the stable positions of the detent torque to each other, thereby stabilizing startup.

The commutating poles in the single phase stepping motor are provided in some of a plurality of pole teeth in each of a pair of stator yokes located on both sides of the stator coil. The commutating poles alter the phase between the pole teeth of the two stator yokes, thereby improving the startup performance of the motor.

However, even if the phase is adjusted by the commutating poles, the stable positions of the holding torque or the detent torque vary depending on the positions and sizes of the commutating poles. The stable positions of the holding torque or detent torque may also vary due to non-uniformities and other factors occurring during manufacture and assembly.

Further, even if commutating poles are provided, what are called "dead zones", where the stable positions of the holding torque or detent torque spread out, may arise due to friction loss or other factors. Should the width of the dead zones become large, the stable positions of the holding torque will easily coincide with the stable positions of the detent torque, resulting in poor startup performance of the motor.

SUMMARY OF THE INVENTION

It is an object of the present invention to provide a stepping motor whose startup performance can be improved without commutating poles. More specifically, an object of the present invention is to provide a stepping motor in which the stable positions of the holding torque can reliably be offset from the stable positions of the detent torque.

According to one aspect of the present invention, a single phase stepping motor comprises:

a stator; and a rotor disposed to surround the stator, wherein the stator includes:

first and second annular stator yokes, which are disposed opposite to each other and have a plurality of pole teeth formed along a circumference thereof; and an annular stator coil disposed between the first and second stator yokes, the rotor includes:

a ring magnet, which is disposed to surround the first and second stator yokes, and has a plurality of magnetic poles formed along a circumference of the rotor; and a shaft disposed at a center position of the magnet, at least a partial region of a gap formed between each of the pole teeth and opposing magnetic pole of the magnet being non-uniform in a predetermined direction.

DETAILED DESCRIPTION OF THE INVENTION

An embodiment of the present invention will hereinafter be described with reference to the accompanying drawings.

Figure 1:
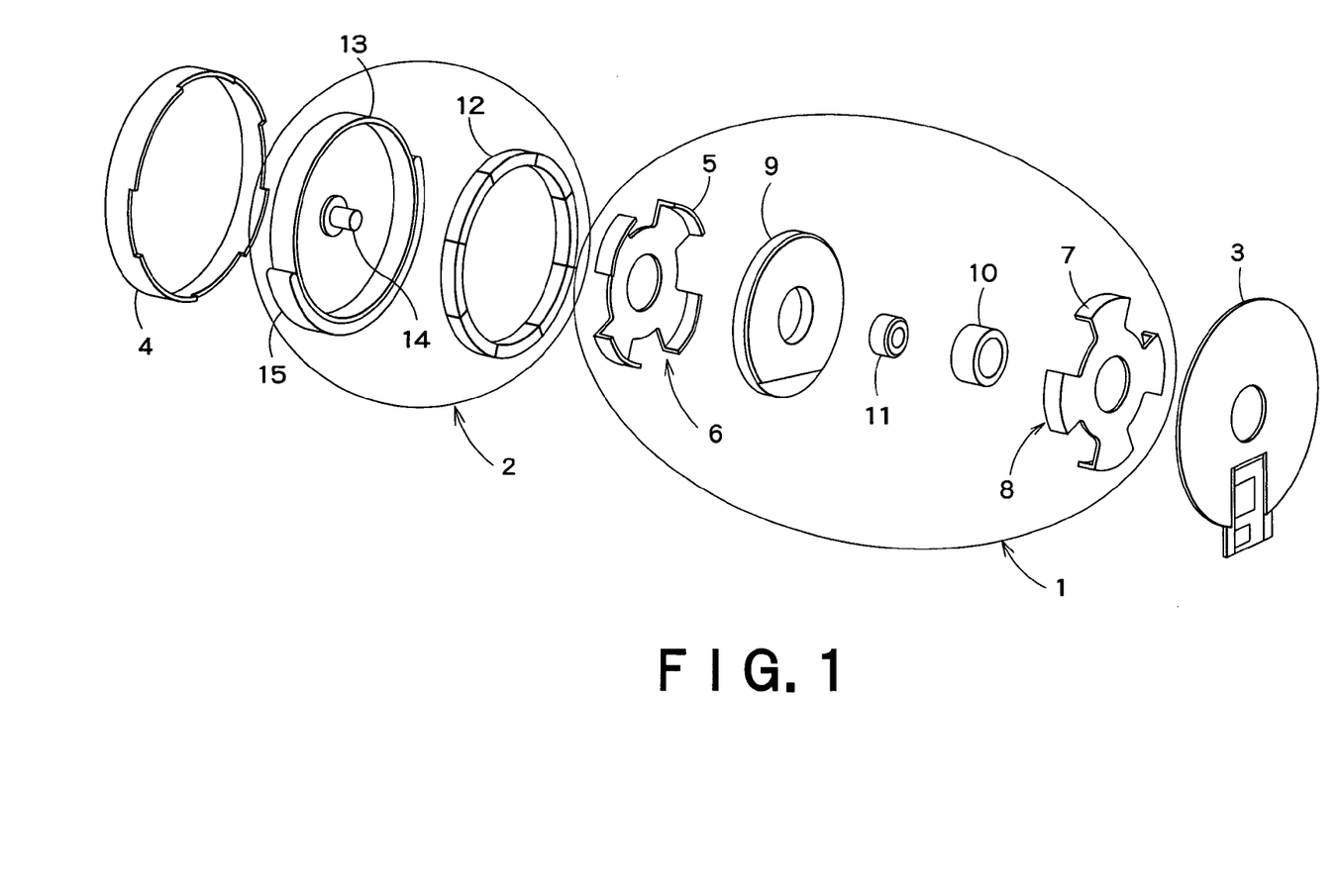
FIG. 1 is an exploded perspective view of a single phase stepping motor according to an embodiment of the present invention.
Figure 2:
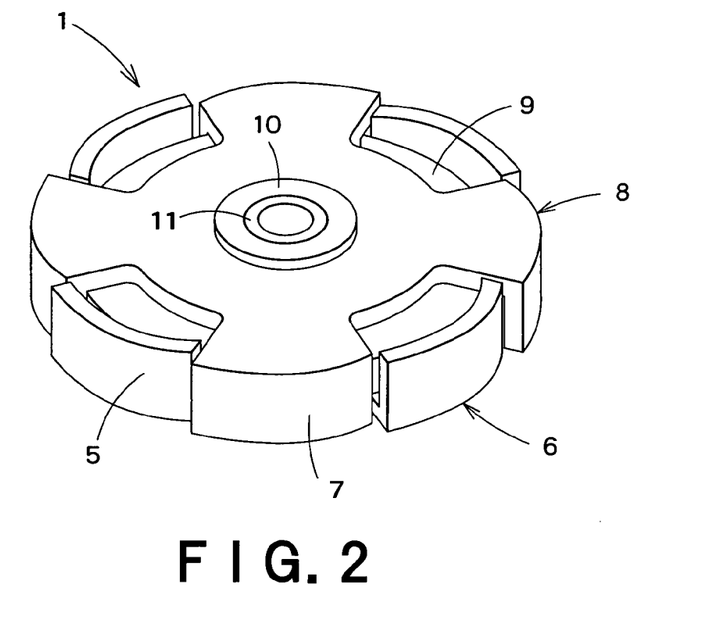
FIG. 2 is a perspective view illustrating the assembled state of a stator portion of the stepping motor in FIG. 1.

FIG. 1 is an exploded perspective view of a single phase stepping motor according to an embodiment of the present invention, and FIG. 2 is a perspective view illustrating the assembled state of the stator portion of the stepping motor in FIG. 1.

The stepping motor according to this embodiment is of an outer rotor type, and includes a stator 1, a rotor 2 that is disposed so as to surround the stator 1, a bracket (bottom plate) 3 that holds the stator 1 and has terminals for power supply, and a cover 4 that protects the rotor 2.

The stator 1 has: a first annular stator yoke 6 that has a plurality of pole teeth 5 around its periphery; a second annular stator yoke 8 that is disposed opposite to the first stator yoke 6 and has a plurality of pole teeth 7; a stator coil 9 that is disposed between the first and second stator yokes 6, 8; a core 10 that is fitted into a hole formed in the center of the stator coil 9; and a metal bearing 11 that is fitted into a hole formed in the center of the core 10.

The rotor 2 has: a ring magnet 12 that is disposed so as to surround the first and second stator yokes 6, 8; a frame 13 that holds the magnet 12; a shaft 14 that is disposed in the center of the frame 13; and an eccentric weight 15 for generating vibration. The magnet 12 has magnetic poles around a circumference thereof, of which the neighboring magnetic poles have different polarities. The total number of the magnetic poles of the magnet is equal to the total number of pole teeth of the first stator yokes 6 and the second stator yokes 8.

When all the component members constituting the stator 1 are assembled, the stator of a stepping motor shown in FIG. 2 is completed.

The first and second stator yokes 6, 8 are interdigitated with each other. The plurality of pole teeth 7 of the second stator yoke 8 are disposed in the gaps between the plurality of pole teeth 5 of the first stator yoke 6, and the plurality of pole teeth 5 of the first stator yoke 6 are disposed in the gaps between the plurality of pole teeth 7 of the second stator yoke 8.

When the current flows through the stator coil 9 of the stepping motor in FIG. 1, magnetic flux corresponding to the direction of the current is generated, and the pole teeth 5, 7 of the first and second stator yokes 6, 8 are magnetized. Since the pole teeth 5, 7 are disposed opposite to the magnetic poles of the magnet 12, the magnetic poles of the magnet 12 and the pole teeth 5, 7 attract or repulse each other depending on their location. This makes the magnet 12 rotate as much as the distance of one magnetic pole (one step). Then, when the direction of the current flowing through the stator coil 9 is changed, the magnet 12 rotates as much as one further step in the same direction. In this way, the magnet 12 is made to rotate in units of each step by alternately switching the direction of the current flowing through the stator coil 9.

Figure 3:
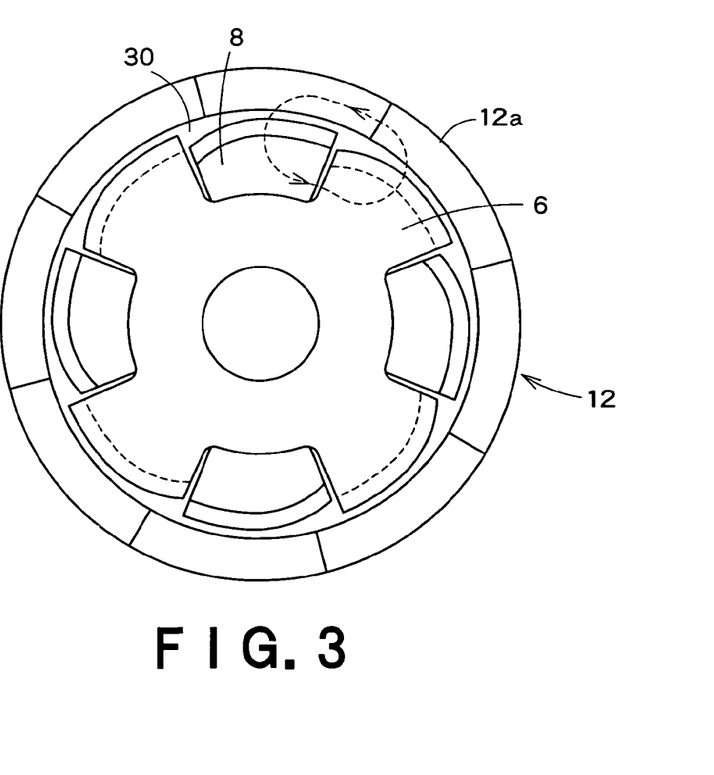
FIG. 3 is a top plan view of the stepping motor of the embodiment.
Figure 4:
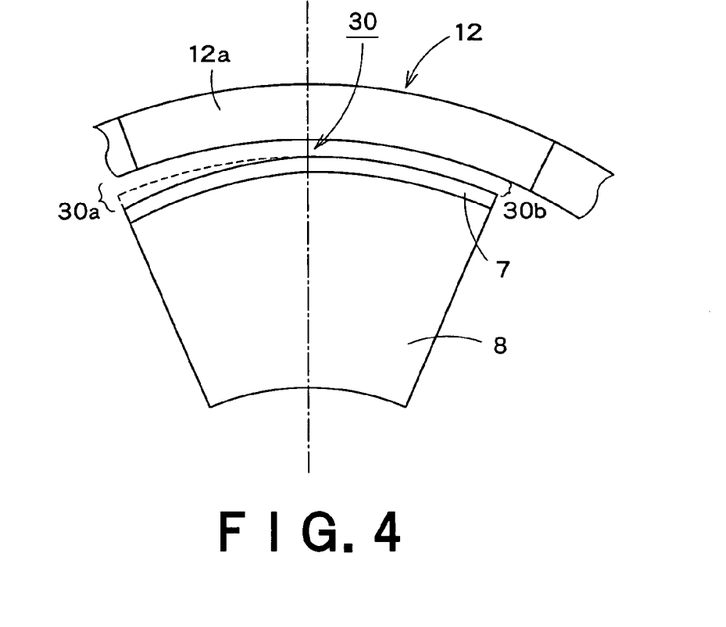
FIG. 4 is an enlarged view of a portion of FIG. 3.

FIG. 3 is a top plan view of the stepping motor according to this embodiment, and FIG. 4 is an enlarged view of a portion of FIG. 3. As shown in FIGS. 3 and 4, the present embodiment has a characteristic feature in which a gap 30 between the plurality of pole teeth 5, 7 of the first and second stator yokes 6, 8 and magnetic poles 12a of the magnet 12 disposed opposite to the pole teeth 5, 7 is made non-uniform in one direction. More specifically, the gap 30 is made uniform on one side from the centers in width dimensions of the pole teeth 5, 7, but widens out gradually (continuously) on the other side.

The reasons for making the gap 30 non-uniform will now be described in detail. When the current flows through the stator coil 9, magnetic flux is generated in a direction that passes though the first and second stator yokes 6, 8 disposed so as to sandwich the stator coil 9 (see arrowed line in FIG. 3). By this magnetic flux, the magnetic poles different from each other are generated to the first and second stator yokes 6, 8. Supposing for example that N poles are formed in the first stator yoke 6 and S poles in the second stator yoke 8, as indicated by the arrowed line in FIG. 3, the magnet flux passes from the first stator yoke 6 through the magnetic pole 12a of the magnet 12, and then it passes through the adjacent magnetic pole 12a, and then it enters into the second stator yoke 8. If the direction of the current in the stator coil 9 is reversed, the direction of the magnetic flux will also be reversed.

In this embodiment, the gap 30 between the pole teeth 5, 7 of the first and second stator yokes 6, 8 and the magnetic poles 12a of the magnet 12 is made non-uniform, so that the density of the magnetic flux becomes higher as a place where the gap 30 is smaller, and the density becomes lower as a place where the gap 30 is larger.

The pole teeth 5, 7 and the magnetic poles 12a are strongly attracted each other at a place where the magnetic flux density is high. This means that on one side from the centers in width dimensions of the pole teeth, i.e., on the side where the gap 30 is smaller, the attractive force toward the opposing magnetic poles 12a is stronger than on the other side where the gap 30 is larger. As a result, each pole tooth portion that lies on one side from the center in width dimension of the pole tooth, namely on the side where the gap 30 is small, is located toward the center of the magnetic pole 12a, while the portion on the other side where the gap 30 is large is located straddling the boundary line between the magnetic pole 12a and the adjacent one 12a, as shown in FIGS. 3 and 4. The rotor 2 therefore stops stably at a position where the pole tooth boundary lines are offset from the boundary lines of the magnetic poles 12a.

More precisely, if the gap 30 is uniform, the motor stabilizes at a state in which the centers in width dimensions of the pole teeth 5, 7 are located opposite to the centers in width dimensions of the magnetic poles 12a, whereas if the gap 30 is made non-uniform, as in the present embodiment, the motor stabilizes at a state in which the centers in width dimensions of the pole teeth 5, 7 are offset from the centers in width dimensions of the magnetic poles 12a.

When the rotor 2 is stopped at positions where the centers in width dimensions of the pole teeth 5, 7 are shifted from the centers in width dimensions of the magnetic poles 12a, and the direction of the current flowing through the stator coil 9 is switched, the pole teeth 5, 7 and the magnetic poles 12a repulse each other more strongly in the regions where the gap 30 is small, and the rotor 2 will rotate in the same direction without failure. In the example illustrated in FIGS. 3 and 4, it will rotate clockwise.

Thus, the stepping motor of this embodiment can be rotated only unidirectionally. But in the case of utilization as a vibration motor, there will be no particular problem even if the rotation direction is fixed.

In the case shown in FIG. 4, gap location 30a having the maximum size of the gap 30 is determined so as to be roughly twice gap location 30b having the minimum size of the gap 30. This however is merely an example, and the maximum gap could be made to be more than, or less than, twice the size of the minimum gap.

Also, although the gap 30 on one side from the center in width dimension of the pole tooth is made uniform, while the gap 30 on the other side from the center is made non-uniform in FIG. 4, there is no absolute need to vary the size of the gap 30 based on the center in width dimensions. Instead of that, the gap 30 may be gradually varied along the entire width of the pole tooth.

Also, a curvature of the outer periphery portions of the pole teeth may be adjusted by trial and error in the regions where the gap 30 is non-uniform. For instance, the amount of change in the curvature may be decreased on one side from the center in width dimension of the pole tooth to reduce the variation in the gap 30, while the amount of change in the curvature may be increased on the other side from the center to increase the variation in the gap 30.

Figure 5:
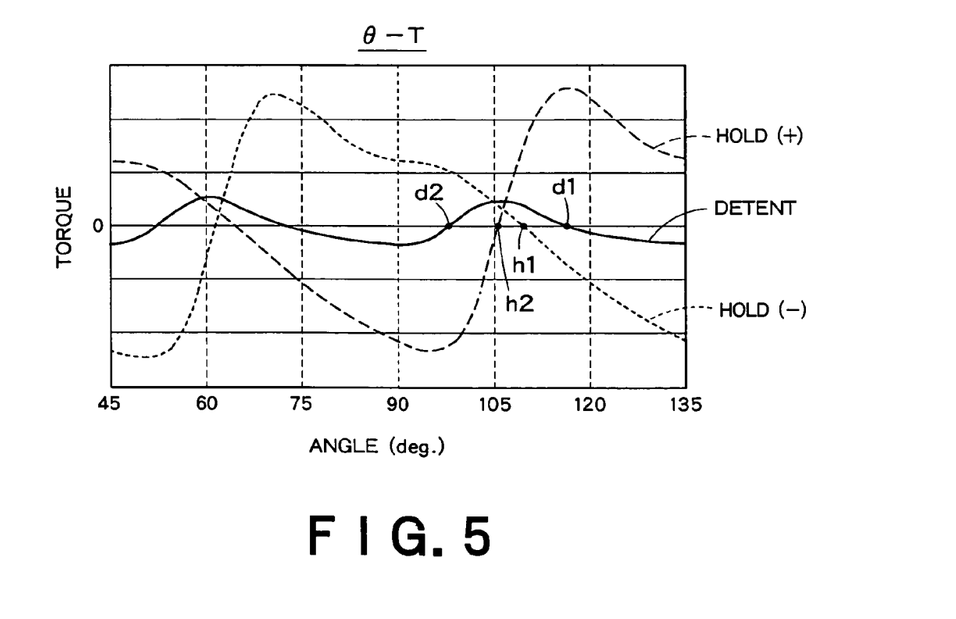
FIG. 5 is a graph of the holding torque and detent torque characteristics of the stepping motor in FIG. 3.

FIG. 5 shows the characteristics of the holding torque and detent torque of the stepping motor in FIG. 3. In FIG. 5, the abscissa represents the angle of rotation and the ordinate represents the torque. Curves illustrated by "HOLD (+)" and "HOLD (−)" in FIG. 5 represent the holding torque in the case where the current flows through the stator coil 9 in one direction, and the case where the current flows in the reverse direction.

A curve illustrated "DETENT" represents the detent torque. The stable positions are positions where these three curves intersect torque=0 on the ordinate.

In FIG. 5, both the HOLD (+) curve and the HOLD (−) curve cross through zero points on the torque=0 line at roughly 45-degree intervals. But if the zero points are crossed at rising portions of the curves, gradients of the curves are steep, and therefore the zero points are in an unstable state. In this case, the magnetic polarity of the magnetic poles 12a and the magnetic polarity of the opposing pole teeth 5, 7 are the same, as will be described hereafter. By contrast, if the zero points are crossed at falling portions of these curves, the gradient will be gradual and the rotor will stably stop. This is the case where the polarity of the magnetic poles 12a and the polarity of the opposing pole teeth 5, 7 are opposite, as will be described hereafter. Hence, the holding torque essentially has its stable positions at 90-degree intervals.

On the other hand, the "DETENT" curve crosses the zero points at roughly 22.5-degree intervals. Even in this curve, the falling portions are of a more gradual gradient than the rising portions, and the holding torque essentially has its stable positions at 45-degree intervals.

As shown in FIG. 5, in this embodiment, the stable positions of the holding torque do not coincide with the stable positions of the detent torque, and therefore the rotor 2 can be reliably rotated in the proper manner when the direction of the current flowed through the stator coil 9 is switched.

Figure 6A:
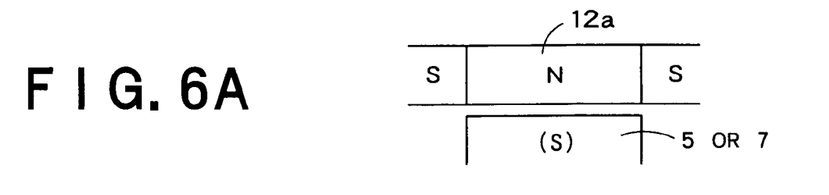
FIGS. 6A, 6B and 6C are diagrams illustrating the positional relationship between magnetic poles 12a of a magnet 12 and pole teeth 5 and 7 of the stator yokes 6 and 8 at zero point d1 in FIG. 5.
Figure 6B:
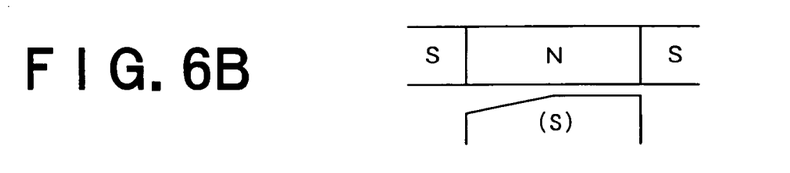
Figure 6C:
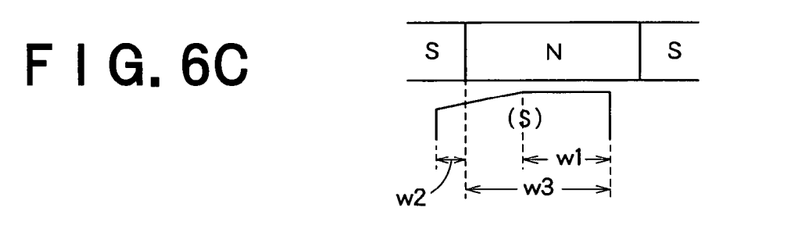

The reason why the stable positions of the holding torque and the stable positions of the detent torque are offset will now be described in detail. FIGS. 6A, 6B, and 6C are diagrams illustrating the positional relationship between the magnetic poles 12a and the pole teeth 5 and 7 at zero point d1 (where torque=0) in FIG. 5. For the sake of simplicity, in FIGS. 6A, 6B, and 6C, the magnetic poles 12a of the magnet 12 are depicted using straight lines, the pole teeth disposed opposite to the magnetic poles 12a are depicted as rectangular forms, and the gap is depicted as varying linearly.

The zero point d1 in FIG. 5 represents a stable position of the detent torque. Since the detent torque represents a torque held when the power is not supplied to the stator coil 9, the polarity of a pole tooth disposed opposite to the magnetic pole 12a of the N pole will be the S pole.

FIG. 6A illustrates the case where the gap is uniform, and FIG. 6B illustrates the case where the gap is non-uniform. When the gap is non-uniform, the magnetic pole 12a and the pole tooth will be more strongly attracted each other at the regions where the gap is smaller, so that instead of stopping at the position in FIG. 6B, the rotor 2 moves in such a manner that the center of pole tooth region w1 having a small gap approaches the center of the magnetic pole 12a, as shown in FIG. 6C. As a result, one region w2 of the pole tooth is protruded beyond the boundary line of the magnetic pole 12a toward the adjacent magnetic pole. The polarity of the pole tooth at the protruding region w2 becomes the N pole, since the opposing magnetic pole 12a is the S pole.

Thus, at the zero point d1 in FIG. 5, one region w2 of the pole tooth differs in polarity from another region w3, and each of these regions has the opposite polarity to the magnetic pole 12a disposed opposite to the pole tooth, so that the magnetic force acts to attract the regions and poles to each other, and the rotor stops stably.

Figure 7A:
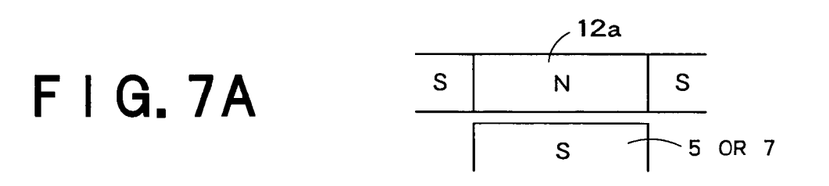
FIGS. 7A, 7B and 7C are diagrams illustrating the positional relationship between the magnetic poles 12a and the pole teeth 5 and 7 at zero point h1 in FIG. 5.
Figure 7B:
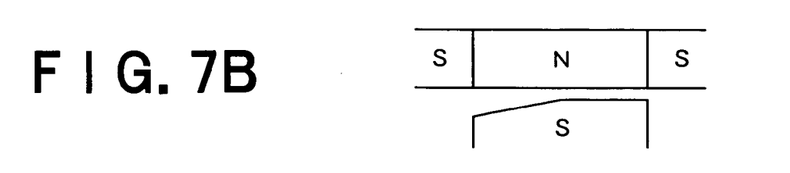
Figure 7C:
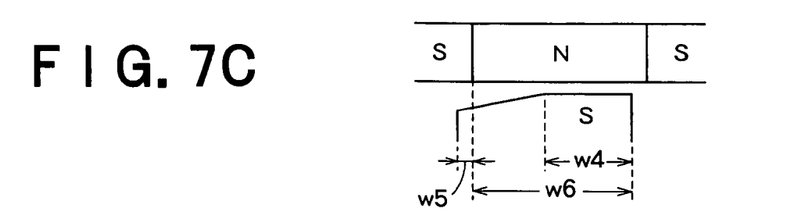

FIGS. 7A, 7B, and 7C are diagrams illustrating the positional relationship between the magnetic poles 12a and the pole teeth 5 and 7 at zero point h1 (where torque=0) in FIG. 5. This zero point h1 represents the stable position of the holding torque (a rightward falling portion of the HOLD (−) curve) when the current flows through the stator coil 9 in a first direction.

FIG. 7A illustrates the case where the gap is uniform, and FIG. 7B illustrates the case where the gap is non-uniform. When the gap is uniform, the rotor stops stably at a position where the polarity of the magnetic pole 12a and the polarity of the pole tooth are opposite to each other. More specifically, the rotor stops at a position where the center of the magnetic pole 12a coincides with the center in width dimension of the pole tooth. On the other hand, when the gap is non-uniform, instead of stopping at the position in FIG. 7B, the rotor 2 moves in such a manner that the center of pole tooth region w4 having a small gap approaches the center of the magnetic pole 12a, as shown in FIG. 7C. As a result, one region w5 of the pole tooth protrudes beyond the boundary line of the magnetic pole 12a toward the adjacent magnetic pole 12a. The polarity of the pole tooth at the protruding region w5 is the S pole, which is the same as the polarity at region w6 corresponding to the rest of the tooth, which is the same polarity as the opposing magnetic pole 12a. Because of this, the magnetic pole 12a and the pole tooth repulse each other at the protruding region w5, and the width of the protruding region w5 becomes smaller than that of the region w2 in FIG. 6C.

Thus, the regions of the pole teeth that protrude beyond the boundary line of one magnetic pole 12a have different widths in FIG. 6C and in FIG. 7C, which means that the stable positions of the detent torque are different from the stable positions of the holding torque.

Figure 8A:
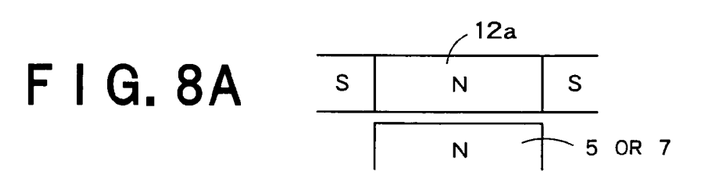
FIGS. 8A, 8B and 8C are diagrams illustrating the positional relationship between the magnetic poles 12a and the pole teeth 5 and 7 at zero point h2 in FIG. 5.
Figure 8B:
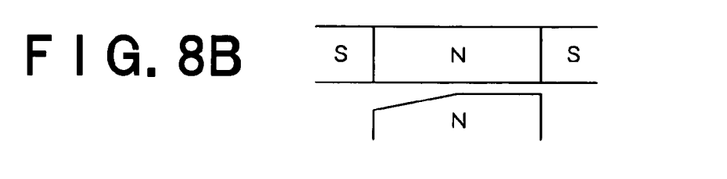
Figure 8C:
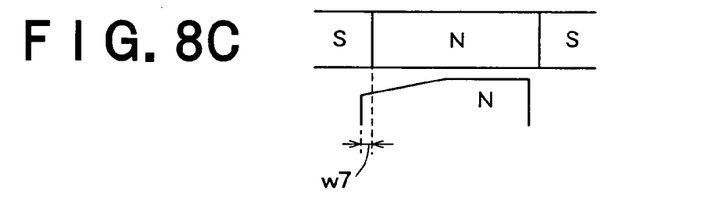

FIGS. 8A, 8B, and 8C are diagrams illustrating the positional relationship between the magnetic poles 12a and the pole teeth 5 and 7 at zero point h2 (where torque=0) in FIG. 5. This zero point h2 represents the stable position of the holding torque (a rightward rising portion of the HOLD (+) curve) when the current flows through the stator coil 9 in a second direction.

FIG. 8A illustrates the case where the gap is uniform, and FIG. 8B illustrates the case where the gap is non-uniform. As can be seen from FIG. 5, the gradient of the curve at this zero point h2 is steep, and this is essentially not a stable position. At the zero point h2, the polarity of the pole tooth and the polarity of the opposing magnetic pole 12a are the same, and therefore the pole tooth and the magnetic pole 12a repulse each other. However, the polarity of the pole tooth and the polarity of the magnetic poles 12a located at both sides of the magnetic pole 12a disposed opposite to the pole tooth are opposite to each other, and they therefore attract each other. As a result, when the gap is uniform, there is a possibility of stopping at the position in FIG. 8A, albeit unstably. In the case of high assembly precision of the motor, although it will be extremely rare for the rotor to stop stably at the position in FIG. 8A, there is a possibility that the rotor may be stable at that position due to non-uniformities in assembly precision.

If the gap is non-uniform, the rotor 2 stops at, instead of position in FIG. 8B, a position where the center of the magnetic pole 12a and the center in width dimension of the pole tooth are a little offset, as shown in FIG. 8C. The reason for this is that although the repulsive force between the pole tooth and the magnetic pole 12a is stronger in the region where the gap is smaller, the forces attracting the pole tooth to the magnetic poles 12a located on both sides of the opposing magnetic pole 12a are imbalanced due to the gap being non-uniform. As a result, the stable positions between the magnetic pole 12a and the pole tooth are shifted from those in FIG. 8A.

However, the width of region w7 protruding beyond the boundary line of the magnetic poles 12a is not the same as that of the region w2 in FIG. 6C or the region w5 in FIG. 7C. This is because the direction and size of the magnetic force acting between the pole tooth and the magnetic poles 12a are different.

Figure 9A:
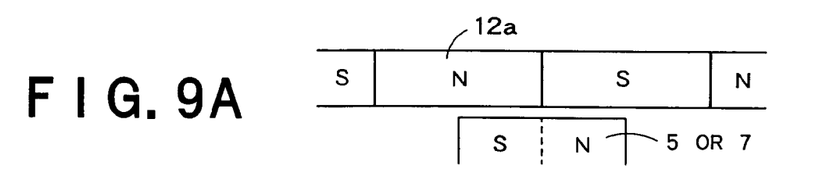
FIGS. 9A, 9B and 9C are diagrams illustrating the positional relationship between the magnetic poles 12a and the pole teeth 5 and 7 at zero point d2 in FIG. 5.
Figure 9B:
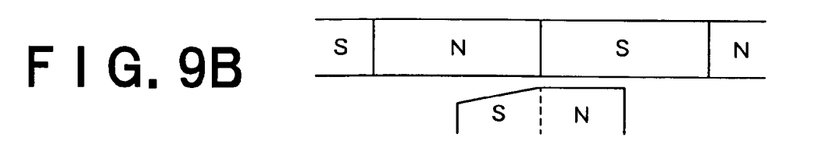
Figure 9C:
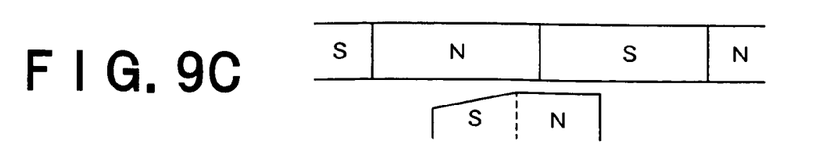

FIGS. 9A, 9B, and 9C are diagrams illustrating the positional relationship between the magnetic poles 12a and the pole teeth 5 and 7 at zero point d2 (where torque=0) in FIG. 5. This zero point d2 represents the stable position of a rightward rising portion of the "DETENT" curve, which represents the detent torque characteristics. FIG. 9A illustrates the case where the gap is uniform, and FIG. 9B illustrates the case where the gap is non-uniform. When the gap is uniform, the rotor 2 stops at a position where the boundary line of the magnetic poles 12a coincides with the center in width dimension of the pole tooth. In the case shown in FIGS. 9A, 9B, and 9C, the current does not flow through the stator coil 9 and therefore the polarity of the pole tooth is opposite to the polarity of the magnetic pole 12a disposed opposite to the pole tooth. In FIG. 9A for example, the right half of the pole tooth, which is disposed opposite to the S pole of the magnetic pole 12a, has the N pole, while the left half of the pole tooth, which is disposed opposite to the N pole of the magnetic pole 12a, has the S pole.

If the gap is non-uniform, the rotor 2 stops at, instead of position in FIG. 9B, a position where the boundary line of the magnetic poles 12a and the center in width dimension of the pole tooth are a little offset, as shown in FIG. 9C. The reason is that the rotor 2 moves in such a manner that the attractive forces between the pole tooth and the magnetic poles 12a located on both sides of the boundary line are balanced. The stable position in FIG. 9C is different from the stable positions in FIGS. 6C, 7C and 8C, and so there is no risk that the stable position of the holding torque coincides with the stable position of the detent torque.

Figure 10:
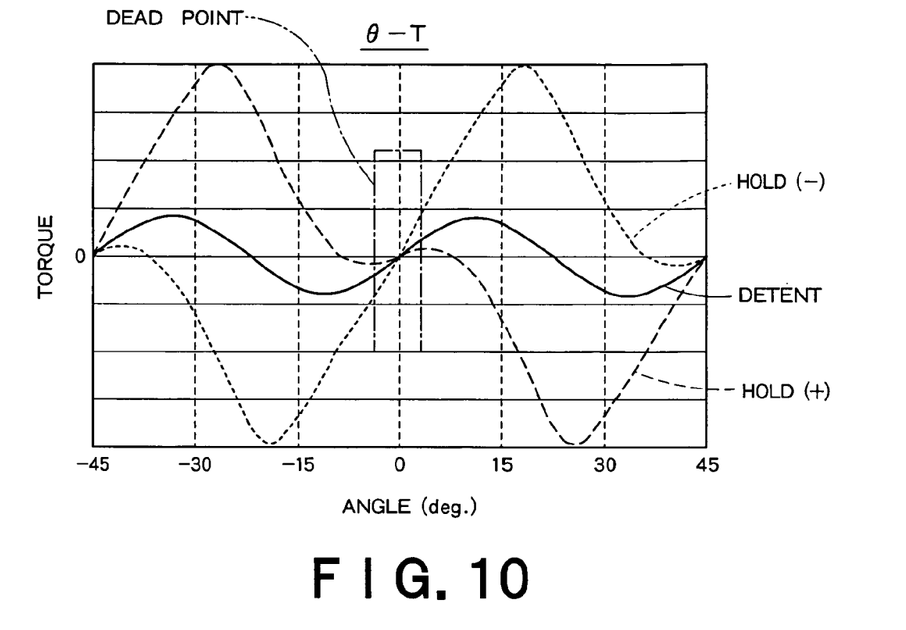
FIG. 10 is a graph of the characteristics of a stepping motor provided with commutating poles.
Figure 11:
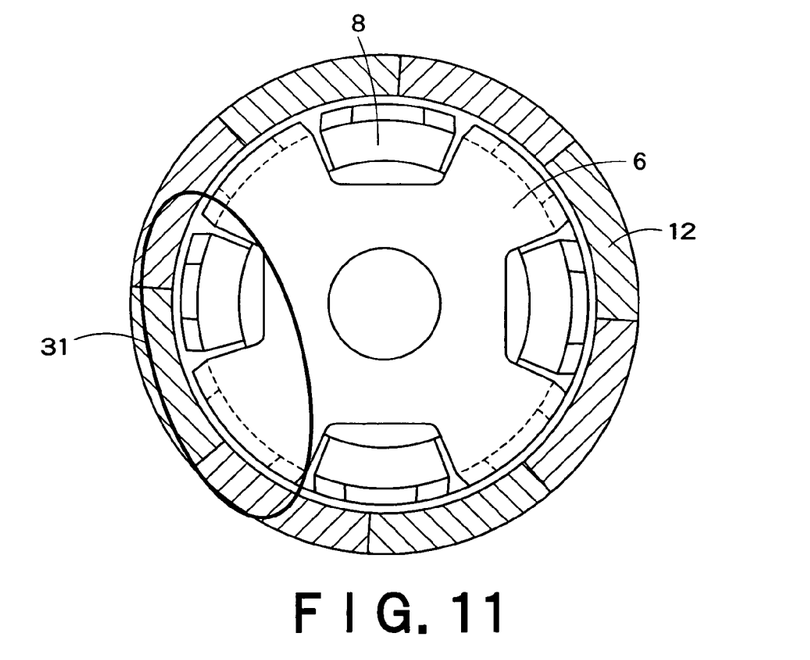
FIG. 11 is a top view of a stepping motor that has commutating poles.

FIG. 10 shows the characteristics of a stepping motor that has an uniform gap 30 and is provided with commutating poles 31 as shown in FIG. 11. In the stepping motor in FIG. 11, the stable position of the holding torque and the stable position of the detent torque coincide with each other in certain cases, and there is no guarantee that the rotor starts up normally from the stop position.

Accordingly, in this embodiment, the gap 30 between the pole teeth of the first and second stator yokes 6, 8 and the opposing magnetic poles 12a of the magnet 12 is made non-uniform in the same direction in at least one region, so that the magnetic force between the pole teeth and the magnetic poles 12a is also non-uniform, and as a result the centers in width dimensions of the pole teeth and the centers of the magnetic poles 12a are offset from each other. The offset amount at a stable position of the holding torque is different from the offset amount at a stable position of the detent torque.

Thus, the holding torque stable position does not coincide with the detent torque stable position, and no matter what position the rotor 2 stops at, the rotor 2 rotates without failure when the current flows through the stator coil 9. Hence, the startup performance of the motor is improved.

Although the foregoing embodiment describes an example where the stator yokes 6, 8 have the same number of pole teeth as the number of the magnetic poles in the magnet 12, namely eight, the number of the magnetic poles 12a and pole teeth are by no means limited to those particular quantities in the embodiment. Neither are the sizes of the magnet 12 or the first and second stator yokes 6, 8 limited to those described in the embodiment.

The present invention is not limited to the foregoing individual embodiment, and those skilled in the art should be able to arrive at additional effects and numerous variants of the invention on the basis of the foregoing descriptions. Numerous additions, alterations and partial omissions can be made without departing from the spirit and scope of the present invention as expressed by the appended claims and equivalents thereof.

The invention claimed is:

1. A single phase stepping motor comprising:
   a stator; and
   a rotor disposed to surround the stator,
   wherein the stator includes:
   first and second annular stator yokes, which are disposed opposite to each other and have a plurality of pole teeth formed along a circumference thereof; and
   an annular stator coil disposed between the first and second stator yokes, wherein the rotor includes:
   a ring magnet, which is disposed to surround the first and second stator yokes, and has a plurality of magnetic poles formed along a circumference of the rotor; and
   a shaft disposed at a center position of the ring magnet,
   wherein the pole teeth and the ring magnet are positioned such that a gap is formed between each of the pole teeth and the opposing magnetic pole of the ring magnet, and
   wherein each of the gaps has a first half side from a center position in a width dimension of each of the pole teeth that is uniform and a second half side that is non-uniform in a predetermined direction.

2. The stepping motor according to claim 1, wherein the second half side of each of the gaps varies continuously.

3. The stepping motor according to claim 1, wherein the gaps are formed so that the center position in the width dimension of each of the plurality of pole teeth is shifted from both a center position of the opposing magnetic pole of the ring magnet and boundary lines for two magnetic poles neighboring to the opposing magnetic pole in a stable position of a detent torque.

4. The stepping motor according to claim 1, wherein the rotor rotates in only one direction.

5. The stepping motor according to claim 1, wherein each of the gaps is formed so that a stable position of a holding torque does not coincide with a stable position of a detent torque.

* * * * *